Feb. 6, 1962  D. C. LANTZ  3,020,212
REFUSE CONVERTER
Filed Nov. 4, 1959  4 Sheets-Sheet 1

INVENTOR
DAE C. LANTZ

BY
Kimmel & Crowell
ATTORNEYS

Feb. 6, 1962 D. C. LANTZ 3,020,212
REFUSE CONVERTER
Filed Nov. 4, 1959 4 Sheets-Sheet 2
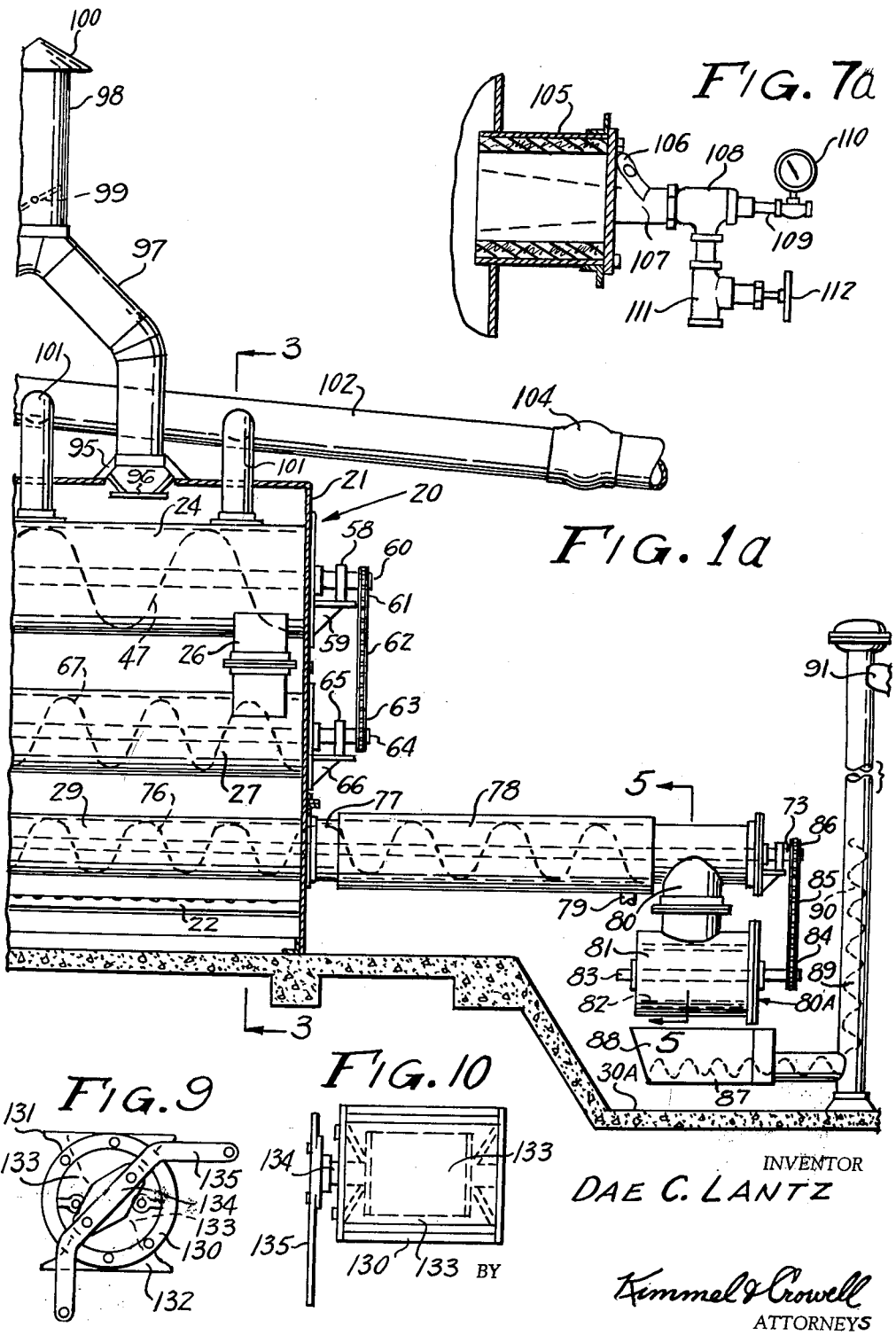
INVENTOR
DAE C. LANTZ
BY Kimmel & Crowell
ATTORNEYS

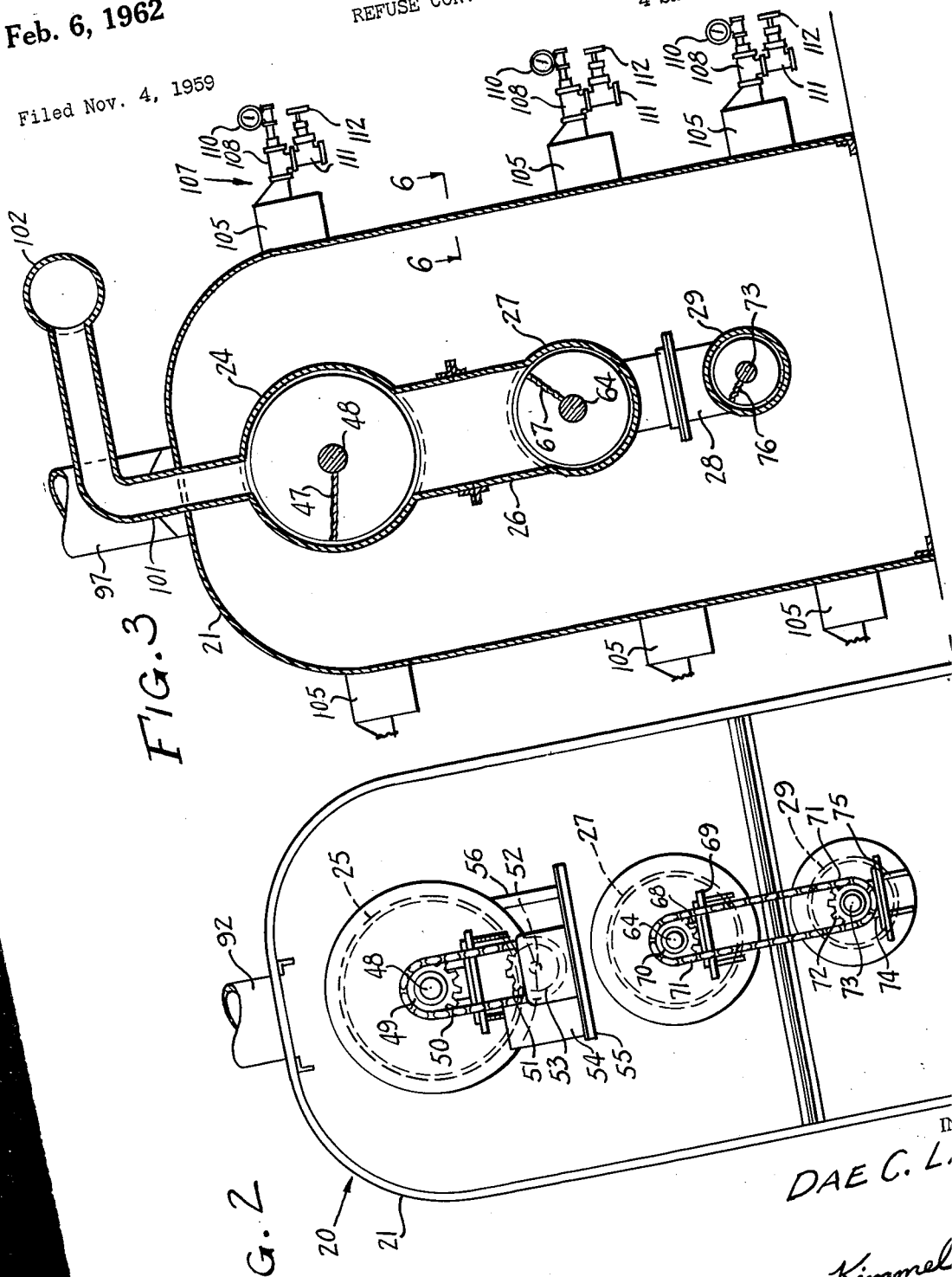

Feb. 6, 1962 D. C. LANTZ 3,020,212
REFUSE CONVERTER

Filed Nov. 4, 1959 4 Sheets-Sheet 4

INVENTOR
DAE C. LANTZ

BY Kimmel & Crowell
ATTORNEYS

United States Patent Office 3,020,212
Patented Feb. 6, 1962

3,020,212
REFUSE CONVERTER
Dae C. Lantz, Burbank, Calif., assignor to Pan American Resources, Inc., Burbank, Calif.
Filed Nov. 4, 1959, Ser. No. 850,840
1 Claim. (Cl. 202—118)

This invention relates to a refuse converter and has as its primary object the provision of an improved refuse converter for the reclaiming of useable material from refuse, or waste products.

An additional object of the invention is the provision of a continuously operable multiple screw type refuse conveyor and converter wherein the combustible gas formed as a product of combustion of the refuse may be concentrated as a recoverable creosote liquid, and the carbonaceous solid residue may be similarly recovered and stored.

A further object of the invention is the provision of an automatic screw type converter of this nature which may be operated with a minimum of supervision, being substantially self operating and requiring a minimum inspection time for its successful use and operation.

A further object of the invention is the provision of a device of this character which is sturdy and durable in construction, reliable and efficient in operation, and highly effective in recovering the greatest possible percentage of useable products from refuse or waste material.

Still other objects reside in the combinations of elements, arrangements of parts, and features of construction, all as will be more fully pointed out hereinafter, and disclosed in the accompanying drawings wherein there are shown preferred embodiments of this inventive concept.

In the drawings:

FIGURES 1 and 1A comprise a single side view, partially in elevation, and partially in section, of one form of converter embodying features of the instant invention;

FIGURE 2 is an enlarged end elevational view of the construction of FIGURE 1, as viewed from the left;

FIGURE 3 is an enlarged sectional view taken substantially along the line 3—3 of FIGURE 1A, as viewed in the direction indicated by the arrows;

FIGURE 7a is a detailed sectional view of one of the outlet members of FIGURE 3;

FIGURE 9 is a view in end elevation showing still another form of manual control; and FIGURE 10 is a top plan view of the structure of FIGURE 9.

Similar reference characters refer to similar parts throughout the several views of the drawings.

Figure 1:
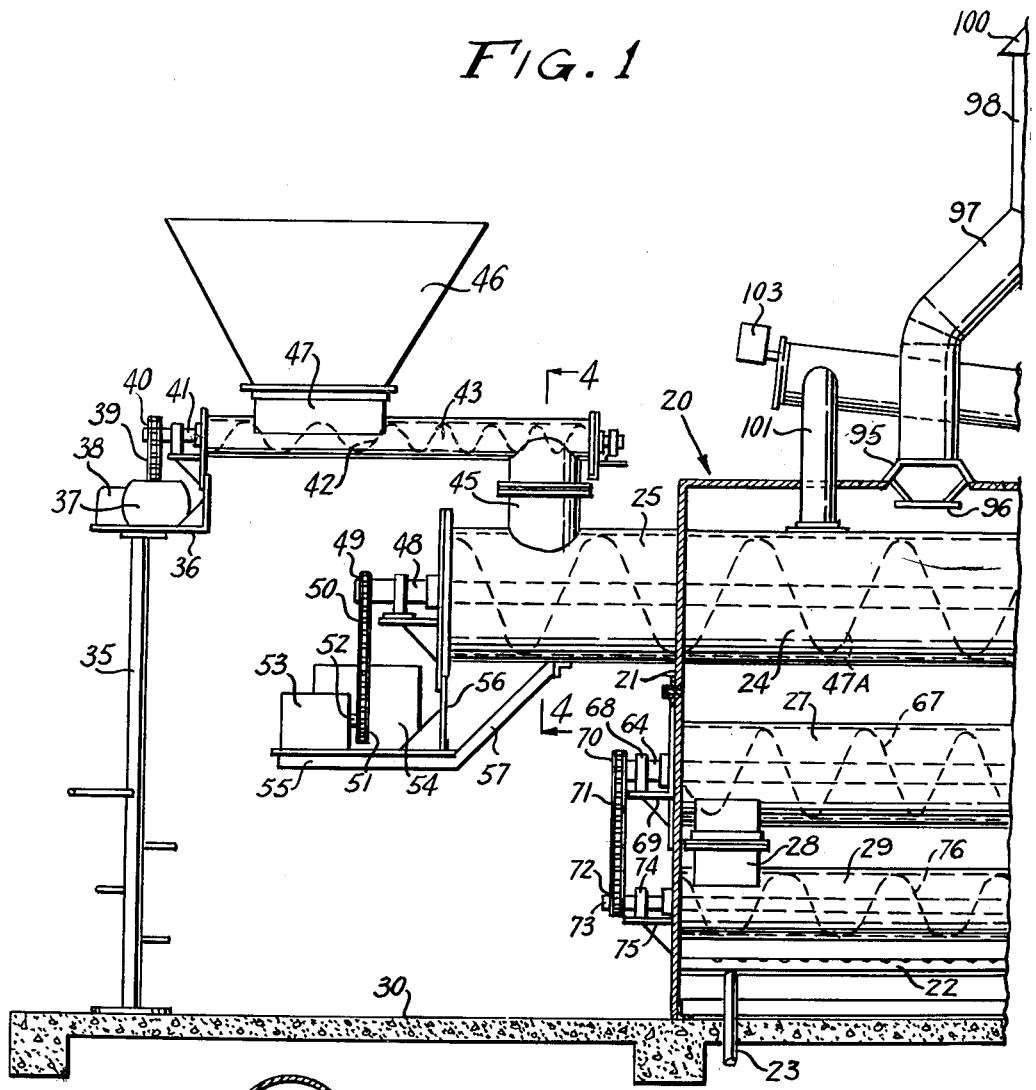

Having reference now to the drawings in detail, there is generally indicated at 20 a refuse converter embodying features of the instant invention, which comprises a combustion chamber, or housing 21, including a gas or other burner 22, which is suitably supplied with fuel from any desired source, as through a line 23. Positioned interiorly of the housing 21 and extending transversely across the top thereof, is a relatively large diameter pipe 24, a portion of which 25 extends exteriorly of the housing 21.

The pipe 24 has an outlet pipe 26 adjacent one end thereof and positioned interiorly of the housing 21, which pipe connects with a second horizontally disposed pipe or tubular member 27, the latter being provided at its opposite end with an outlet pipe or duct 28 which is smaller than pipe 26. The pipe 28, in turn, connects with a smaller diameter pipe 29 which extends longitudinally of the housing 21 in parallelism with the pipes 24 and 27, it being noted that each of the three pipes are of progressively smaller diameter in descending relation.

The entire assembly is mounted on a suitable concrete base, or floor, generally indicated at 30, which base also carries a vertical support member 35, at the upper end of which is positioned a platform 36, upon which is mounted an electric or other suitable type of motor 37. The motor 37 drives through a conventional gear box 38, a chain 39, which, in turn, drives the sprocket 40. The sprocket 40 is mounted on a shaft 41 which comprises an extension of a helical conveyor member 42 which is contained in a transverse pipe 43 which is located exteriorly of the housing 21 in parallelism to and above the pipe 24. A communicating pipe 45 is provided at the end of the pipe 43 and in communication with the end of the pipe 25 exteriorly of the housing 21. A refuse hopper 46, having an open bottom 47, communicates with the pipe 43, and is adapted for the initial reception of refuse to be treated in the system. The refuse is first ground or pulverized, or otherwise prepared for combustion in any desired manner, which comprises no part of the instant invention, and is then fed into the hopper 46 for feeding into the system.

As the refuse passes through the pipe 45, into the end 25 of pipe 24, it is advanced by means of a helical conveyor 47A, which is mounted on a shaft 48 which extends entirely through the pipe 24 and its extending end 25. The shaft 48 is adapted to be driven by a sprocket 49 through a chain 50, which, in turn, is driven by a sprocket 51, from the shaft 52 of a gear box 53, which, in turn, is driven by a suitable electric motor 54, or the like. Motor 54 and gear box 53 are mounted on a platform 55, which is supported in depending relation by a hanger 56 and reinforcing bars 57 secured to the underside of pipe 25 exteriorly of the housing or combustion chamber 21.

The other end of the shaft 48 extends outwardly of the opposite end of the pipe 24 and the housing 21, and is supported on a bushing 58 carried on a supporting plate 59 secured to the outside of the housing 21. This end 60 of shaft 48 carries the sprocket 61, which, through a chain 62, drives the sprocket 63 mounted on the end of a shaft 64, which is supported in a bearing 65 carried by a supporting plate 66. The shaft 64 extends entirely through the pipe 27, and has a helical conveyor 67 mounted thereon, opposite to the helical conveyor 47A previously described. The last mentioned helical conveyor 67 is adapted to move partially treated refuse from the pipe 26 to the opposite end of the pipe 27, and, thence, to the outlet 28. The end of the shaft 64 also extends out of the opposite end of the housing 21, being supported in a bearing 68 carried by a mounting plate 69, and through a sprocket 70 drives a chain 71, which, in turn, drives a sprocket 72 mounted on the end of a shaft 73 which is also supported in a bearing 74 by plates 75, and which extends through the pipe 29. The shaft 73 also carries the helical conveyor 76 in opposite arrangement to the conveyor 67 so that refuse passing through the pipe 28 into the pipe 29 is conveyed to the far end of the housing 21. It then passes through an exterior pipe 77, through a suitable cooling unit 78, which is supplied with a cooling medium through an inlet pipe 79, and through a depending exit 80 to a rotary feeder contained in a housing 81. The feeder 80A consists of a plurality of radially disposed blades 82 mounted on an axle or shaft 83, which shaft is driven by means of a sprocket 84 mounted on the end thereof, a chain 85 and an additional sprocket 86 mounted on the end of shaft 73, which extends entirely through the pipe 29, and its outer extension 77. This feeder is adapted to deposit the solid residue resulting from the combustion of the refuse in a hopper 87, which is mounted in a depressed portion 30A or base or floor 30, and is carried by means of a screw conveyor 88, or the like, to a vertical conveyor 89 mounted within a vertically positioned pipe 90, from the top of which an outlet 91 extends, which conducts the treated carbonaceous residue to a storage bin, or the like.

The top of the housing 21 is provided with a pair of exhaust openings 95, beneath which are positioned baffle plates 96, and from which extend exhaust pipes or conduits 97, which, in turn, join into a common stack or outlet 98 which is provided with an internal conventional damper 99 and a cap, or cover, 100, the outlets 95 being provided for the escape of the heat and gases of combustion created by the gas burner 22.

Additional ducts 101 are positioned at spaced intervals and communicate with the pipe 24, to permit the escape of creosote liquids in gaseous form resulting from the combustion of the refuse within pipes 24, 27 and 29. These ducts 101 lead to a common outlet 102, which is provided at one end with a pressure relief valve 103. The duct 102 is downwardly inclined, and is provided with a check valve 104, the arrangements being such that gases, either in gaseous form or as condensed into creosote liquids, are thence conducted to a suitable vapor separator (not shown) which is positioned in a suitable storage tank for gas and creosote liquids, also not shown.

Spaced insulated outlet members 105 are provided at suitable intervals along the side walls of housing 121, and include end plates 106, which are provided with outlet pipes 107. Each of the outlet pipes has at its extremity a T 108, from one leg of which extends a pipe 109 which communicates with the pressure valve 110. The stem of the T 108 is connected to an outlet valve 111, which is controlled by a manual handle 112 for the manual relief of gas pressure within the housing or within the pipes, as may be necessary. This construction is shown most clearly in FIGURES 3 and 7a.

Figure 6:
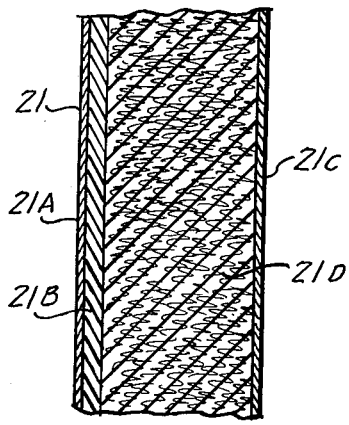
FIGURE 6 is an enlarged sectional detail view of the furnace wall construction.
Figure 7:
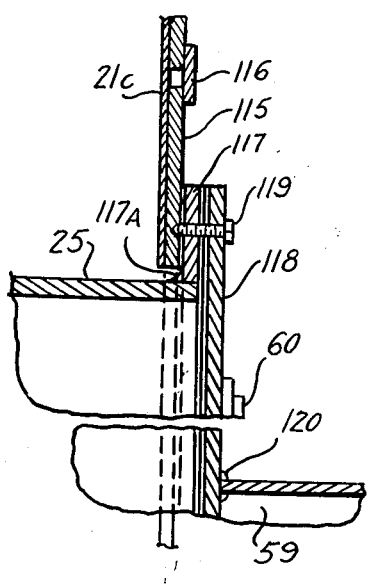
FIGURE 7 is an enlarged fragmentary sectional detail view of a portion of the firebox end construction.
Figure 5:
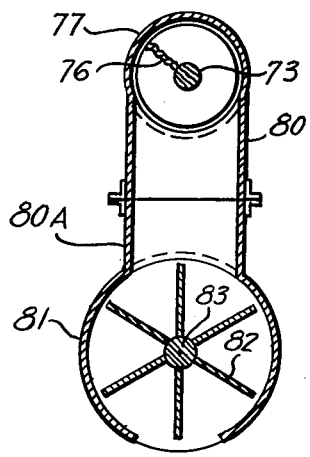
FIGURE 5 is an enlarged sectional view taken substantially along the line 5—5 of FIGURE 1A, as viewed in the direction indicated by the arrows.

Details of the boiler construction are best shown in FIGURES 6 and 7, wherein it is to be noted that the walls of the housing 21 are comprised of an inner, relatively heavy metallic sheet 21A, with an outer stainless finishing sheet 21B suitably secured thereto in any desired manner, as by screws or nails. An outer, relatively thin protective sheet 21C surrounds the entire housing, and the space between sheets 21A and 21C is packed with insulating material 21D, thus retaining the heat interiorly of the housing for the complete combustion of the refuse.

FIGURE 7 shows a detail of the end wall of the firebox, wherein the outer sheet 21C is provided with end plates 115, secured in position by reinforcing bars 116. The end of the pipe, illustratively the pipe 25, is provided with a flange 117, which is welded thereto, as at 117A, after adjustment, and a closure plate 118 is secured thereto, as by means of screws 119. The closure plate 118 is apertured to permit the extension of the shaft 60 therethrough, and the support 59 is secured, as by welding 120, to the face of the closure plate 118. This construction is carried throughout the ends of pipes 24, 27 and 29 as necessary.

Under certain circumstances it may be desirable to omit the automatically driven rotary feeder and its associated housing 81. In this type of construction the bottom of the outlet pipe 80 is provided with a plate 125, which has pivoted thereto, as on a pivot 126, a valve plate 127, which is controlled by means of a manual handle 128. A latch 129 is provided for holding the valve plate in closed position until such time as it is desired to remove the carbonaceous residue from the outlet pipe 80, which may be done at any suitable intervals.

Still another modified form of construction is disclosed in FIGURES 9 and 10, which may also be substituted for the rotary feeder. In this modification, a cylindrical housing 130 is provided, having a top plate 131, which is adapted to be secured to the lowermost portion of the outlet 80 and a lower opening 132, for the emission of the carbonaceous residue. In this construction, a rotary valve plate 133 is mounted on a shaft 134 for closing the circular valve housing, and is adapted to be moved into open position by means of an operating handle 135, which may be directly controlled by manual means, or which may have chains or the like connected to opposite ends thereof.

From the foregoing the operation of the device should now be readily apparent.

Refuse or waste material is initially fed into the hopper 46 from which it is conveyed through the pipe 43 by means of a helical conveyor 42 to the outlet pipe 45. The helical conveyor 42 is continuous driven by motor 37, while the helix 47A is continuous driven by a motor 54, as previously described. The waste material is then conveyed through pipe 24 to outlet 26, interiorly into the pipe 27, through which it is conveyed by means of a helix 67 to the outlet 28 through which it falls into the pipe 29. The material is then conveyed by helix 76 through pipe 29, to the opposite end of the housing 21, and thence through pipe 77 through the cooling unit 78. The material has, by this time, been reduced to the stage of carbonaceous residue, all of the creosote liquids and gases having been exuded through the pipe 101 into the outlet pipe 102, and thence conveyed to suitable storage tanks for separation and retension. The carbonaceous residue then passes through the outlet 80 to the rotary feeder 80A, and thence into the hopper 87, from which it is conveyed by helix 88 to the vertical conveyor 89, and thence through outlet 91 to suitable storage bins.

Figure 8:
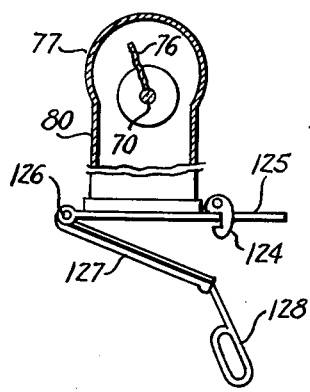
FIGURE 8 is a sectional view similar to FIGURE 5 but showing a modified manual form of control.
Figure 4:
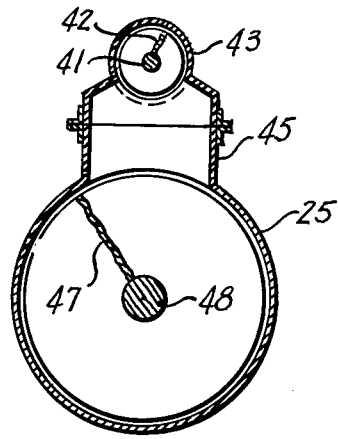
FIGURE 4 is an enlarged sectional view taken substantially along the line 4—4 of FIGURE 1, as viewed in the direction indicated by the arrows.

Obviously, if the manual controls of the modifications of FIGURES 8, 9 and 10 are substituted for the rotary feeder 80A, it will be understood that the material is released at pre-determined selected intervals by manual or other control means for conveyance through the outlet 91 to the storage bins.

From the foregoing it will now be seen that there is herein provided a continuously operating, automatic, screw type refuse converter, which accomplishes all the objects of this invention, and others, including many advantages of great practical utility and commercial importance.

As many embodiments may be made of this inventive concept, and as many modifications may be made in the embodiments herein shown and described, it is to be understood that all matter herein is to be interpreted merely as illustrative and not in a limiting sense.

I claim:

In a continuously operating refuse converter, the combination of a housing comprising a combustion chamber, a burner in the bottom of said combustion chamber, a first pipe extending horizontally of said housing and having an end extending out of said housing, a refuse receiving hopper communicating with said extending end, a helical conveyor rotatable in and filling said first pipe, a second pipe of smaller diameter than said first pipe in a said housing beneath and parallel to said first pipe, a second helical conveyor rotatable in and filling said second pipe, a first outlet passage between said first and second pipes at the end thereof opposite said hopper, said second helical conveyor operating in the direction opposite to that of said first helical conveyor, a third pipe of smaller diameter than said second pipe below and parallel to said second pipe, a second outlet passage between said second pipe and said third pipe at the end thereof opposite said first outlet passage and smaller than said first outlet passage, a third helical conveyor rotatable in and filling said third pipe and operating in a direction opposite to that of said second helical conveyor, said third pipe having an end extending out of said housing at the end thereof opposite said refuse receiving hopper, cooling means surrounding the extending end of said third pipe, power means for driving all of said helical conveyors, an outlet at the end of said third pipe for discharging carbonaceous residue, said outlet comprising a rotary feeder including a housing, a rotatable shaft therein, and radial blades extending from said shaft, means comprising a chain and sprocket connection with said third helical conveyor for rotating said shaft, and outlet means communicating with said first pipe and extending out of the top of said housing adapted for the discharge of combustible gas into a storage unit.

References Cited in the file of this patent

UNITED STATES PATENTS

| | | |
|---|---|---|
| 500,424 | Pierson | June 27, 1893 |
| 551,113 | Ekelund | Dec. 10, 1895 |
| 783,624 | Davis | Feb. 28, 1905 |
| 1,196,470 | Aldama | Aug. 29, 1916 |
| 1,375,714 | McLeod | Apr. 26, 1921 |
| 2,398,446 | Phillipson | Apr. 16, 1946 |